United States Patent [19]

Johnson, Jr.

[11] Patent Number: 4,966,510

[45] Date of Patent: Oct. 30, 1990

[54] TRAILER FOR TRANSPORTING GOLF CARTS AND THE LIKE

[76] Inventor: James N. Johnson, Jr., 112 Lakenheath La., Matthews, N.C. 28105

[21] Appl. No.: 362,705

[22] Filed: Jun. 6, 1989

[51] Int. Cl.$^5$ .............................................. B60D 3/07
[52] U.S. Cl. ........................................ 410/26; 410/3; 410/24
[58] Field of Search ..................... 410/4, 6, 8, 3, 15, 410/24, 24.1, 26, 27, 29.1; 414/228, 547, 495, 477, 478; 296/37.1, 37.6

[56] References Cited

U.S. PATENT DOCUMENTS

| | | | |
|---|---|---|---|
| 2,486,189 | 10/1949 | McCormick | 414/538 |
| 2,541,288 | 2/1951 | Rice | 414/537 |
| 2,705,081 | 3/1955 | Jacobs | 414/537 |
| 3,043,454 | 7/1962 | Butler et al. | 410/26 |
| 3,044,645 | 7/1962 | Smith | 414/462 |
| 3,375,947 | 4/1968 | Kissilov | 414/467 |
| 3,557,712 | 1/1971 | Milenkovic | 410/4 |
| 3,741,604 | 6/1973 | Heath | 414/470 |
| 3,756,428 | 9/1973 | White | 414/789.7 |
| 4,122,962 | 10/1978 | Goodwin, Sr. | 414/460 |
| 4,174,797 | 11/1979 | Yasue et al. | 224/42.21 |
| 4,647,270 | 3/1987 | Maloney | 414/470 |
| 4,738,575 | 4/1988 | Blodgett et al. | 410/26 X |
| 4,749,317 | 6/1988 | Daniel | 410/26 |
| 4,753,566 | 6/1988 | Wegner | 414/459 |
| 4,801,229 | 1/1989 | Hanada et al. | 410/26 |

*Primary Examiner*—Andres Kashnikow
*Assistant Examiner*—Virna Lissi Mojica
*Attorney, Agent, or Firm*—Shefte, Pinckney & Sawyer

[57] ABSTRACT

An apparatus configurable to support different types of loads on a wheeled vehicle during over-the-road travel includes a substantially enclosed compartment, an intermediate support shelf disposed interiorly of the compartment for relative movement therein and an apparatus for selectively moving the intermediate support shelf between a first position for supporting a first plurality of golf carts and the like thereon for transport thereof at a predetermined height above the floor of the compartment to permit the simultaneous transport of the second plurality of golf carts and the like disposed on the floor, and a second position in which the intermediate support shelf is in substantially flush relation with the boundaries of the interior of the compartment. An auxiliary load supporting structure is also provided for supporting at least one additional golf cart and the like in the clearance between the enclosed compartment and the road and includes a frame movably mounted to the over-the-road vehicle selectively movable between an inclined position for rolling the additional golf cart or the like between the road and the frame and a transport position in which the additional golf cart and the like is supported at a height sufficiently above the road for normal traveling operation of the over-the-road vehicle. Pivoted ramps are provided for selective positioning to load and unload the golf cars and the like into the over-the-road vehicle.

18 Claims, 7 Drawing Sheets

TRAILER FOR TRANSPORTING GOLF CARTS AND THE LIKE

BACKGROUND OF THE INVENTION

The present invention relates to an apparatus for supporting loads for transport by a wheeled vehicle during over-the-road travel and, more particularly, to an apparatus configurable to support different types of loads on a wheeled vehicle during over-the-road travel.

There are two typical types of wheeled vehicles adapted for transporting loads over-the-road, namely a vehicle having a truck chassis equipped with box-like container compartment for support and storage of a load therein during transport, and a tractor-trailer combination, commonly known as a semi-trailer, which includes an elongate box-like load supporting compartment mounted on a wheeled chassis, the wheeled chassis being connected in an articulated manner to a self-propelled tractor. Additionally, one version of the tractor-trailer combination basically includes a load supporting compartment defined within a metal framework with the load being substantially open to the elements. Common examples of this version of the tractor-trailer combination are the various commercially available trailers for transporting automobiles which typically include a lower support surface for supporting one tier of automobiles and an upper support surface supported by the metal framework at a clearance above the first tier of automobiles for supporting a second tier of automobiles thereon, the upper support surface being accessible by hydraulically operated ramps which can be selectively inclined to provide a ramp for individually driving the automobiles onto the upper support surface. As can be understood, the automobiles transported on such open metal frame trailers are exposed to the elements although this is not a significant concern, especially balanced against the flexibility provided by these types of trailers in which the upper support framework can be adjusted relative to the lower support framework for maximizing the automobile load capacity of the trailer without exceeding the over-the-road height and width constraints imposed by such structures as bridges and roads, and by Department of Transportation regulations. Moreover, such metal framework automobile transport trailers have been modified to include vinyl or canvas-like coverings which can be selectively rolled up, in a manner similar to awnings, to provide access to the interior of the trailer and which can be selectively extended in covering disposition over the outside of the metal framework to provide protection to the automobiles being transported against the elements.

Tractor-trailer combinations similar to the automobile tractor-trailer combinations have also been adapted for transport of specialized loads, such as self-propelled golf carts of the type which typically include a molded fiberglass body capable of supporting two or three passengers and their golf equipment, mounted on a three or four wheeled chassis. Such golf cart trailers are basically similarly configured to the automobile metal framework trailers and provide the capability to load the golf carts thereon in rows and columns. However, the metal framework trailer is not well suited for transporting other types of loads which are commonly carried by the conventional box-like closed compartment type trailers described above thus limiting the versatility of these trailers because golf carts are typically transported in one direction only such as, e.g., from the golf cart manufacturer to the buyer, and the trailer is not capable of hauling conventional loads upon its return to its origin. It would thus be advantageous if the golf cart transport trailer had the capability of carrying conventional-type loads so that, instead of making an empty or non-load transporting return trip after the delivery of the golf carts, the golf cart transport trailer user could haul conventional type loads on the return trip and thereby generate additional revenues.

SUMMARY OF THE INVENTION

Briefly described, the present invention provides an apparatus for supporting golf carts and the like during transport thereof in a vehicle for transporting golf carts and the like, the vehicle being of the type having a chassis. The apparatus includes a substantially enclosed compartment mounted on the vehicle chassis, an intermediate support disposed interiorly of the compartment and an arrangement for selectively moving the intermediate support. The substantially enclosed compartment includes a pair of spaced apart, generally parallel walls, each wall having an upper and lower portion, the wall upper portions supporting therebetween an overhead covering means, and a floor positioned between the pair of walls and connected to the wall lower portions. The wall, the overhead covering and the floor define the boundaries of the interior of the substantially enclosed compartment.

The intermediate support disposed interiorly of the substantially enclosed compartment is connected thereto for movement relative thereto and is movable between a first position for supporting a first plurality of the golf carts and the like thereon for transport at a predetermined height above the floor to permit the simultaneous transport of a second plurality of golf carts and the like disposed on the floor, and a second position in which the intermediate support is disposed in substantially flush relation with the boundaries of the interior of the substantially enclosed compartment, whereby unrestricted access to substantially the entire interior volume of the substantially enclosed compartment is available without restriction when the intermediate support is at the second position thereof.

An arrangement is provided for selectively moving the intermediate support means between its first and second positions. Preferably, the intermediate support means includes a generally planar shelf for supporting the golf carts and the like, and the arrangement for selectively moving the shelf includes a cable winch and a plurality of cables connected to the cable winch and to the shelf. The cable winch is operable to selectively wind and unwind the cables to effect movement of the shelf means.

According to one feature of the present invention, the shelf includes a first portion, a second portion and a connector movably connecting respective ends of the first and second portions for relative movement of the first and second portions about an axis generally transverse to the walls, whereby the first portion is movable between an inclined position in which it is inclined upwardly from its free end toward its respective connected end to permit travel thereover of the golf carts and the like during loading and unloading of the second shelf portion, and a level position in which the first shelf portion is generally co-planar with the second shelf portion for the support thereon of the golf carts and the like in the first position of the intermediate support.

Preferably, each wall includes a plurality of brackets movable between a position in which they are substantially flush with the associated wall, and a support position in which they extend generally perpendicularly to the associated wall for supporting the intermediate support thereon.

According to another feature of the present invention, an auxiliary load supporting structure is provided for supporting at least one additional golf cart and the like in the clearance between the vehicle chassis and the road. The auxiliary load supporting structures includes a frame for supporting the additional golf cart or the like in a substantially stationary position relative to the vehicle during normal traveling operation of the vehicle along the road, the frame including a plate member for supporting the wheels of the golf cart and the like during rolling movement therealong, the plate member having a front and back edge, and an arrangement for mounting the frame to the vehicle. The mounting arrangement permits selective movement of the auxiliary load supporting structure between a receiving position in which the plate member front edge is positioned closely adjacent the road and the plate member is inclined toward the road from its back edge to its front edge, whereby the additional golf cart or the like can easily be rolled from the road and onto the inclined plate member, and vice versa, and a transport position in which the plate member is disposed at a height sufficiently above the road for normal traveling operation of the vehicle along the road while supporting the additional golf cart or the like thereon.

Preferably, the apparatus of the present invention includes a ramp mounted on the vehicle, the ramp being movable between a storage position in which it is disposed for transport by the vehicle and a loading position in which it extends between the floor and the road to provide an inclined surface for the travel therealong of the golf carts and the like from the road into said interior of the substantially enclosed compartment, and vice versa.

In one preferred embodiment, the present invention provides an apparatus for storing golf carts and the like in generally fixed positions relative to one another during transport of the stored vehicles by a much larger over-the-road wheeled vehicle. The apparatus includes a generally box-like main storage compartment having a floor of generally parallelogram configuration, a shelf, and a control system. The compartment includes a pair of spaced apart, generally parallel, generally rigid wall members, the wall members being connected to the floor adjacent respective opposite edge portions thereof and extending substantially perpendicularly therefrom, and a covering supported on the wall members in generally facing relation to the floor, the area of the covering bounded by the wall members defining the ceiling of the main storage compartment, and an access opening formed at one end of the main storage compartment. The shelf is disposed interiorly of the main storage compartment and is movable therein. The boundary of the shelf conforms substantially to the boundary of the ceiling, and the shelf provides a substantially rigid surface for supporting a plurality of the golf carts or the like thereon. The shelf has a front portion and a back portion interconnected to one another by a coupling device having a movement axis, the movement axis being generally perpendicular to the walls and the coupling device permitting movement of the front and back portions relative to one another about the movement axis. The control system selectively moves the shelf toward and away from the ceiling, and selectively moves the front shelf portion relative to the back shelf portion about the movement axis. The control system is operable to move the shelf to a loading position for loading the golf carts and the like thereon at which the front shelf portion is disposed intermediate the ceiling and the floor and generally parallel thereto, and the back shelf portion is disposed generally downwardly inclined from the front shelf portion toward the floor. Additionally, the control system is operable to move the shelf between a transport position for supporting the golf carts and the like during transport thereof at which the front and back shelf portion are disposed intermediate the ceiling and the floor and generally parallel thereto, and a disengaged position at which the front and back shelf portions are disposed in substantially flush relation with a selected one of the ceiling or the floor.

According to another feature of the present invention, an apparatus is provided which includes a first ramp, an assembly for selectively interconnecting the first ramp to the over-the-road vehicle for movement of the first ramp between an intermediate position in which it is supported above the road, and a loading position in which it provides support for movements of loads thereover between the road (or another load originating location) and the floor, and an assembly for detachably mounting the first ramp means to the over-the-road vehicle. The detachable mounting assembly mounts the first ramp for movement of the first ramp about an axis generally perpendicular to the floor between its intermediate position and an access position for permitting movement of loads therepast and into or out of the vehicle.

Preferably, the apparatus includes a second ramp, an assembly for selectively interconnecting the second ramp to the over-the-road vehicle for movement of the second ramp independently of the first ramp between an intermediate position in which the second ramp is supported above the road and a loading position in which the second ramp provides support for movement of the loads thereover, and an assembly for detachably mounting the second ramp means to the over-the-road vehicle for movement independent of the first ramp about an axis generally perpendicular to the floor, the second ramp being movable between the associated intermediate position and an access position for permitting movement therepast and into or out of the vehicle.

According to yet another feature of the present invention, an auxiliary load supporting structure is provided which includes a self-actuating latch assembly for selectively preventing downward pivoting of the frame, the latch assembly including a retaining hook pivotally mounted to the over-the-road vehicle and normally maintained in a predetermined position above the aforesaid frame. The hook includes a contoured engagement surface that is engaged by the frame during its movement between the receiving position and the transport position thereof to pivot the hook out of the predetermined pivoted position until the hook clears the shoulder, and to cause the hook to pivot back to its predetermined position, with the hook at least partially underlying a portion of the frame to releasably maintain the frame at its transport position.

DETAILED DESCRIPTION OF THE PREFERRED EMBODIMENTS

Figure 1:
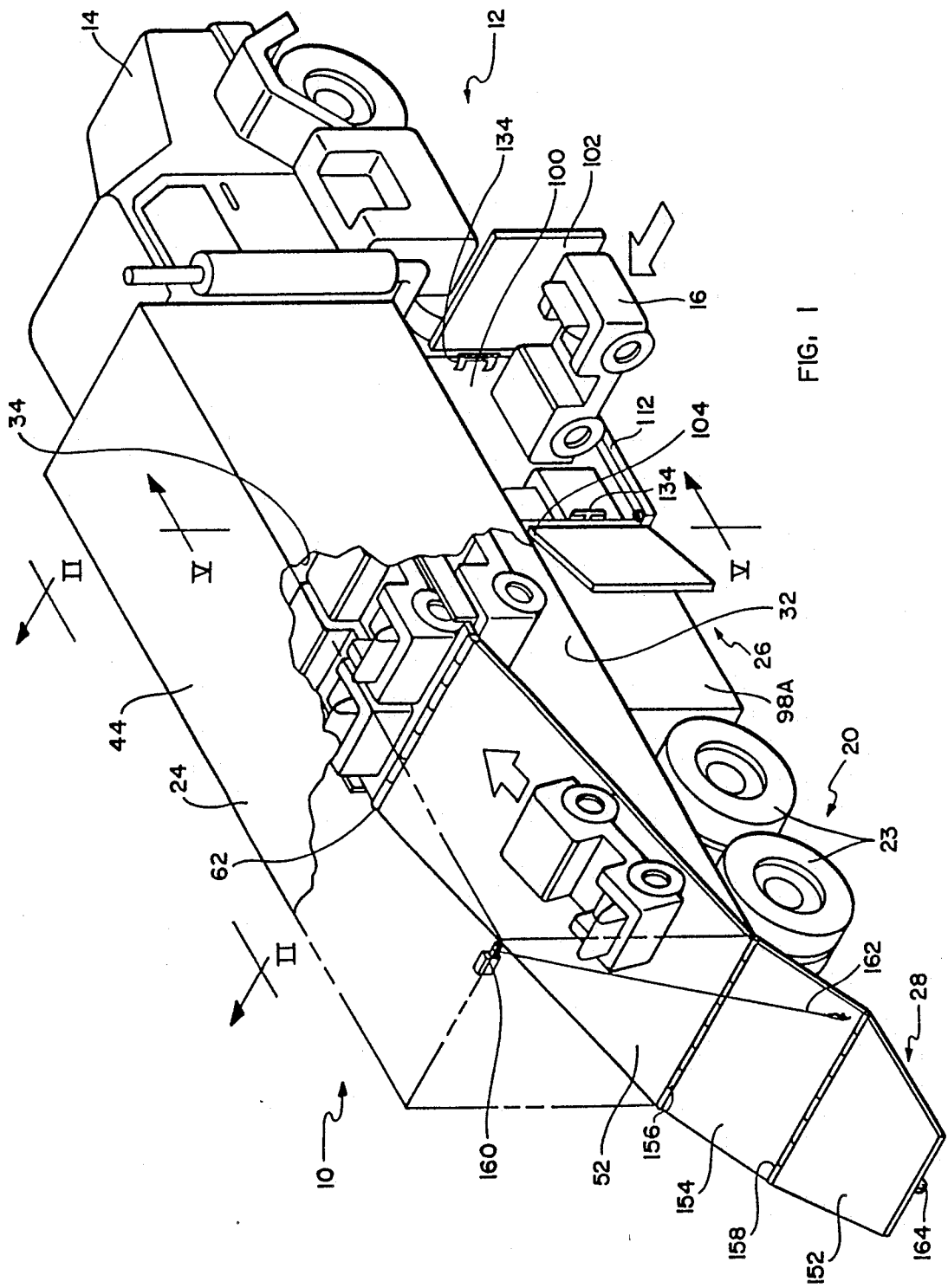
FIG. 1 is a perspective view in partial section of one preferred embodiment of the transport apparatus of the present invention.

The wheeled vehicle transport apparatus of the present invention is illustrated in FIGS. 1-10. Referring initially to FIGS. 1-7, one embodiment of the wheeled vehicle transport apparatus is generally designated as a trailer 10 of a tractor-trailer combination 12. The tractor 14 of the tractor-trailer combination 12 is a conventional motorized tractor having a "fifth wheel" 15 for coupling the trailer 10 thereto for articulated combined movement of the tractor and trailer along a road. The trailer 10 is adapted to be converted between a special load configuration in which it protects and supports a plurality of small wheeled vehicles in predetermined relative positions, such as a plurality of self propelled golf carts 16, for over-the-road travel, and a conventional load configuration in which it hauls a standard load in the same manner as a conventional semi-trailer.

The trailer 10 includes a chassis 18, a pair of wheel assemblies 20 mounted to the underside of the chassis 18 for rollingly supporting the trailer 10 on a road surface, a fifth wheel coupling assembly 22 for coupling the trailer 10 to the fifth wheel of the tractor 14, a main storage unit 24, an underchassis storage unit 26 and a main loading ramp unit 28. The main storage unit 24 is fixedly mounted to, and laterally centered on, the chassis 18. The underchassis storage unit 26 is fixedly mounted to the underside of the main storage unit 24. The main storage loading ramp unit 28 is mounted to the main storage unit 24. As described more fully hereinafter, the main loading ramp unit 28 permits loading and unloading of the golf carts 16 and the standard loads into the main storage unit 24. Additionally, the underchassis storage unit 26 includes a built-in capability for loading and unloading the golf carts 16 and standard loads therein. Both the main storage unit 24 and the underchassis storage unit 26 include a structure for maintaining the golf carts 16 loaded therein in fixed relative positions, and a structure to protect the carts 16 and standard loads when the trailer 10 is both parked and traveling over the road. As a result, the golf carts 16 and the standard loads can be reliably and safely delivered to various sites to which the tractor-trailer combination 12 travels.

The chassis 18, the wheel assemblies 20 and the fifth wheel coupling assembly 22 of the trailer 10 are all of conventional construction as used in many commercially available tractor-trailer combinations. Accordingly, the chassis 18 includes a rigid member extending along the chassis length, the pair of wheel assemblies 20 being mounted adjacent the rear portion of the chassis and the fifth wheel coupling assembly 22 being mounted adjacent the front end of the chassis. Each wheel assembly 20 includes two pair of tandem wheels 23, the wheels of each tandem wheel pair being mounted in side-by-side configuration and the two tandem wheel pairs being oriented generally parallel to one another for rotation of all eight wheels of the pair of wheel assemblies 20 in a direction of travel parallel to the generally elongate portion of the chassis 18. The fifth wheel coupling assembly 22 includes a king pin 30 of conventional construction adapted to be received in a saddle coupling (not shown) of the fifth wheel on the back of the tractor 14. The fifth wheel coupling assembly 22 additionally includes a plurality of electrical connector lines (not shown) for connecting various running light and brake light systems mounted on the trailer 10 to the tractor 14 as well as hydraulic line connectors (not shown) for connecting various brake assemblies (not shown) in the wheel assembly 20 to the tractor 14.

Figure 2:
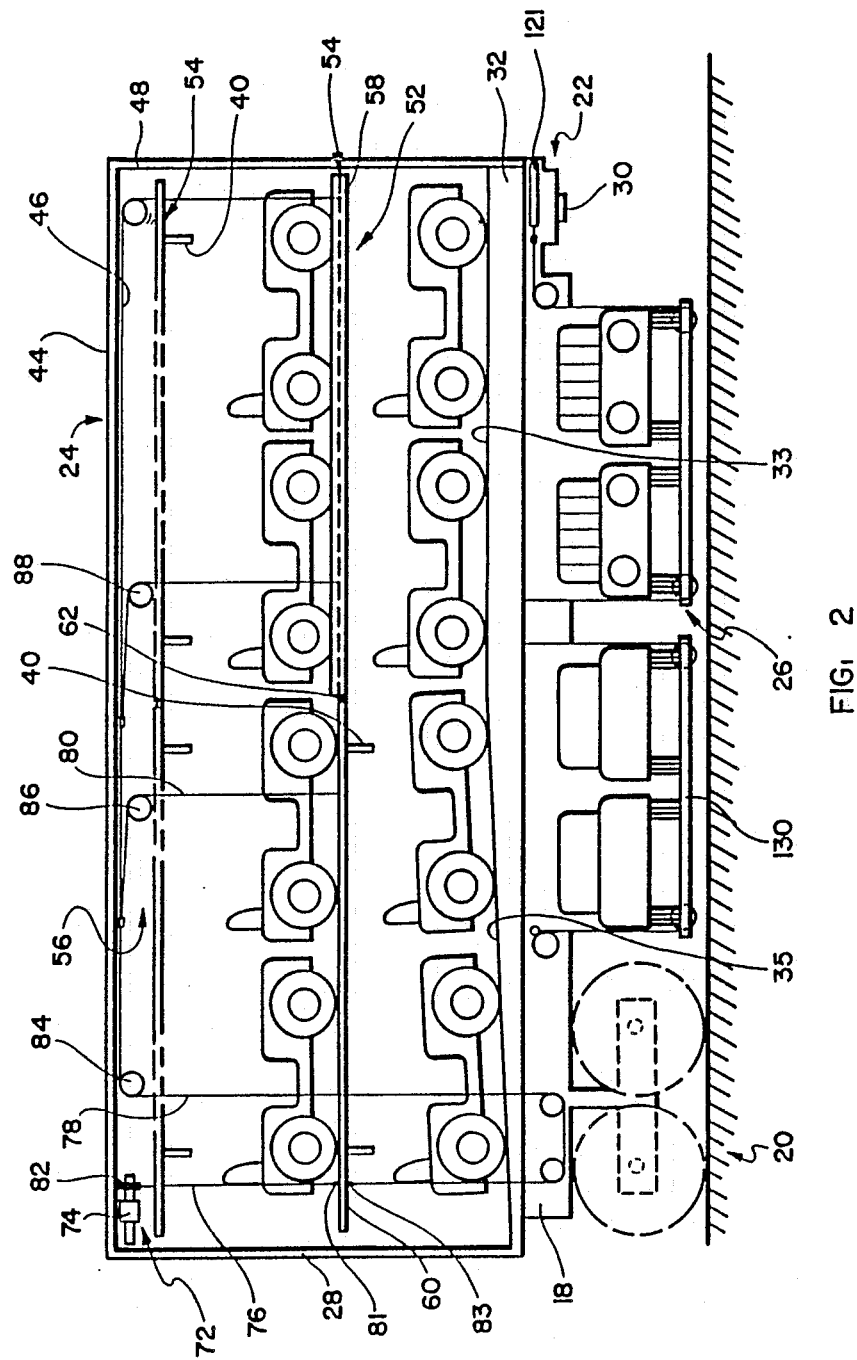
FIG. 2 is a side elevational view, in vertical section, of the transport apparatus shown in FIG. 1.

The main storage unit 24 is of generally box-like configuration with a longitudinal extent about three times greater than its lateral extent and a height extent about the same order of magnitude as its lateral extent. As best seen in FIG. 2, the main storage unit 24 has a floor 32 which has an elongate front portion 33 and an elongate back portion 35, the front and back portions of the floor being at an angle slightly greater than 180° to one another as measured from the interior of the main storage unit 24. The floor 32 is laterally centered on the chassis 18, and fixedly mounted thereto by conventional means (not shown) such as by welding or other suitable attachment means. The floor 32 supports the golf carts 16 and conventional loads during loading and unloading, and during the transport and storage of those items. The floor 32 is preferably composed of tightly jointed wooden floor boards or other suitable means which present a relatively smooth, impermeable surface of sufficient strength and rigidity to resist deflection during the movement and storage of the golf carts 16 and conventional loads thereon.

Figure 7:
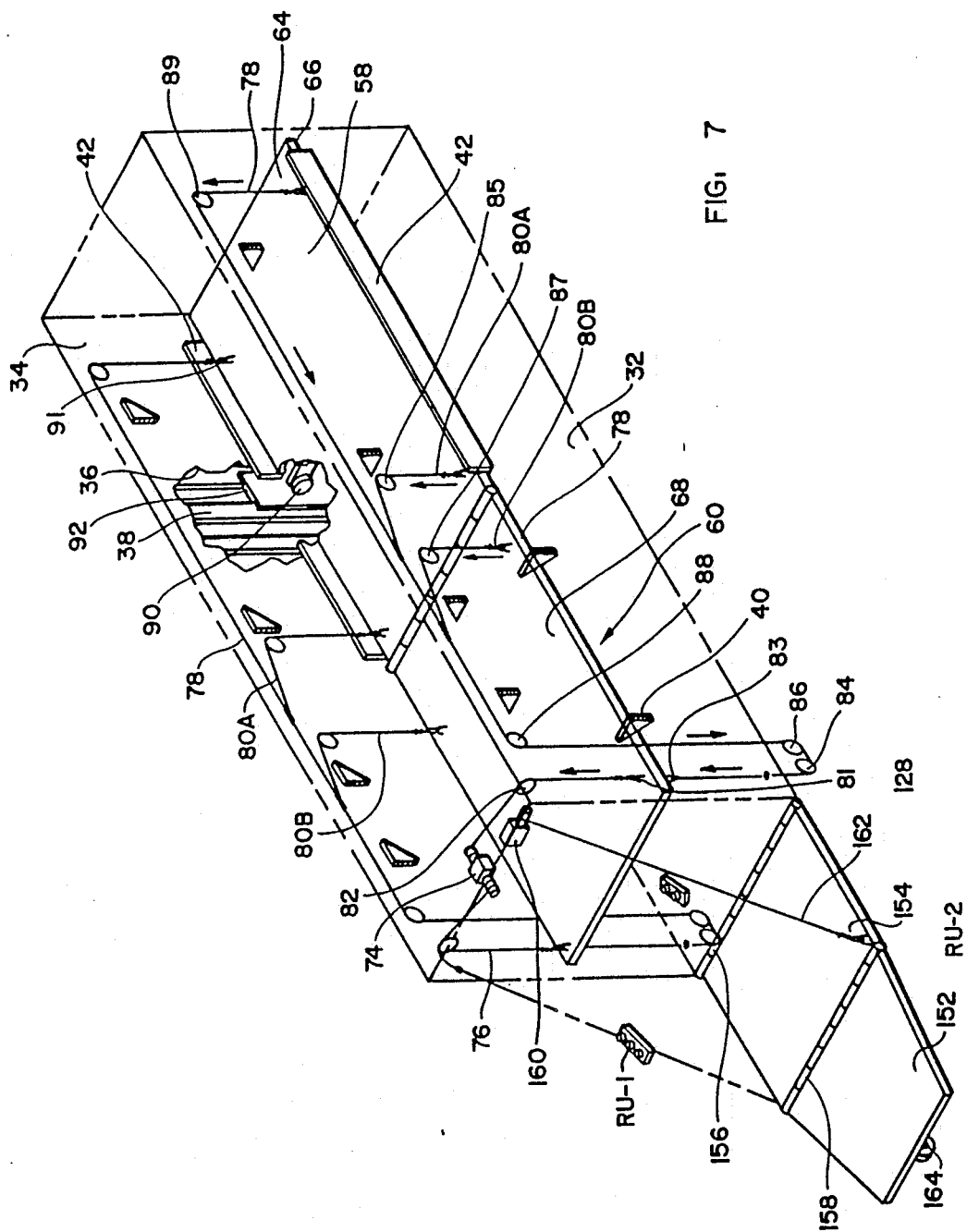
FIG. 7 is a diagrammatic partial perspective view of the transport apparatus shown in FIG. 1.

As best seen in FIG. 1, the main storage unit 24 additionally includes a pair of spaced apart, flat side wall members 34 arranged parallel to one another, the main ramp unit 28 which extends between the side walls 34 at one end thereof, and a front wall member 48 which extends between the wall members 34 at the other ends thereof. Each wall member 34 is mounted to the floor 32 along a respective longitudinal edge thereof and extends generally perpendicularly with respect to the floor 32. As best seen in FIG. 7, the wall members 34 are formed of conventional over-the-road trailer walls specially adapted for use with the present apparatus. Specifically, each wall member 34 includes an outer, relatively thin metal or aluminum skin 36 fastened to a channeled, generally rigid and self standing metal frame 38, a plurality of load bearing brackets 40 which are fixedly mounted on the metal frame 38 opposite the metal skin 36, and an L-shaped rigid steel beam 42 fixedly mounted to the metal frame 38 with its longitudinal extent extending generally parallel to the longitudinal extent of the floor 32.

A roof member 44 constructed of a metal base frame covered on both sides by thin metal coverings is mounted by welding to the top edges of the wall members 34 and the front wall member 48, with the inwardly facing surface of the metal skin of the roof member 44 defining a ceiling 46 in generally facing relation to the floor 32.

Figure 4:
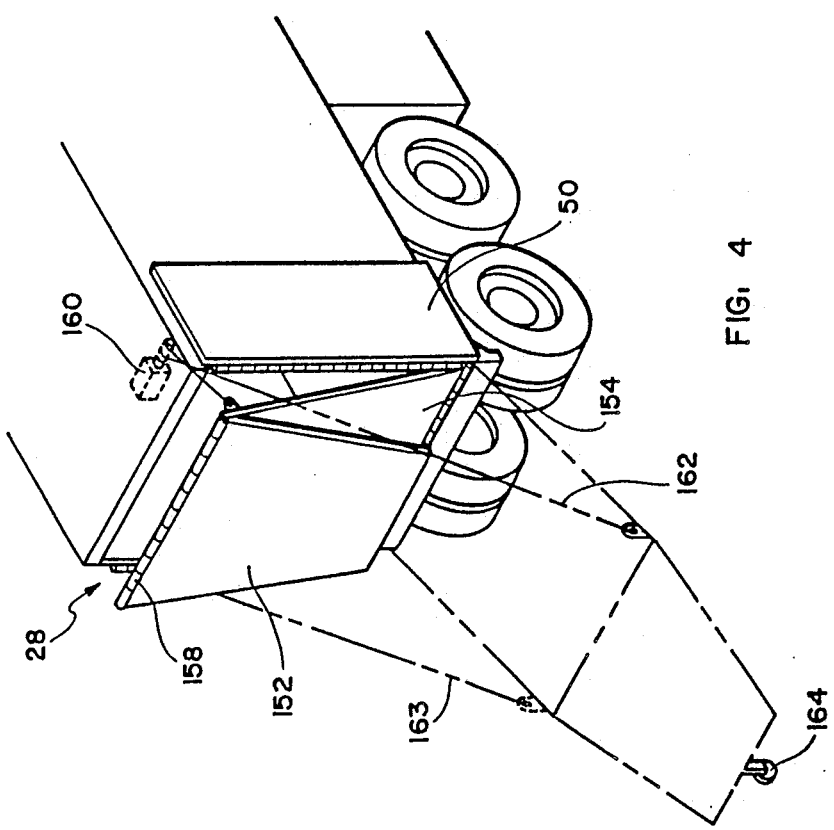
FIG. 4 is a partial rear perspective view of the transport apparatus shown in FIG. 1, showing the ramp member in transition between its deployed position and its storage position.

As best shown in FIG. 4, a pair of doors 50 (only one of which is visible) are hingedly mounted to a vertical edge portion of a respective one of the side wall members 34. Each door 50 has a width approximately equal to one-half the lateral extent of the main storage unit 24, whereby the pair of doors 50 substantially completely seal the opposite end of the main storage unit 24 when pivoted about their respective hinges to their closed position in generally coplanar relationship with one another. The doors 50 are formed similarly to conventional over-the-road trailer doors and include a metal skin fastened to opposite sides of an internal metal framework so as to enclose the metal framework therein. The doors 50 additionally include conventional locking devices for engaging the floor 32 and the roof member 44 to retain the doors 50 in their closed position.

As can be understood, the floor 32, the side wall members 34, the front wall 48, the doors 50 and the ceiling 46 define a substantially enclosed compartment which provides good protection against weather elements and the like for the golf carts 16 and any conventional loads stored therein. Additionally, the compartment provides relatively trouble-free access to all portions thereof for ease of loading and unloading, and the generally box-like configuration of the compartment facilitates planning the loading and parking of the golf carts 16 and conventional loads therein.

To optimize the loading, unloading and storage of the golf carts 16 in the main storage unit 24 as well as the versatility of the trailer 10 between its golf cart hauling configuration and its other load hauling configuration, the main storage unit 24 further includes, as best seen in FIGS. 1, 2 and 7, an intermediate support assembly 52 having a selectively movable shelf unit 54 for supporting a plurality of the golf carts 16 thereon in a position intermediate the ceiling 46 and the floor 32, and a shelf unit positioning assembly 56 for selectively moving the shelf unit 54 in correspondence with the conversion of the trailer 10 from its golf cart hauling configuration to its standard load-hauling configuration. The shelf unit 54 includes a front elongate portion 58 and a back elongate portion 60, the two portions being movably coupled to one another by a coupling hinge 62 movable about a horizontal movement axis. The front portion 58 is of generally rectangular configuration with a longitudinal extent slightly greater than one-half the longitudinal extent of the compartment of the main storage unit 24 and includes a floor 64 supported by a framework 66 composed of metal beams welded together. the front portion 58 is specifically configured with its lateral extent fractionally less than the lateral extent of the compartment of the main support unit 24 and is fractionally greater than the longitudinal extent of the pair of L-shaped metal beams 42 mounted to the side wall members 34. The back portion 60 is of generally rectangular configuration and extends along its longitudinal extent from the coupling hinge 62 to a position adjacent the back opening of the main storage unit 24. The back portion 60 has a construction similar to the front portion 58, and includes a flooring 68 enclosed in and supported by a framework 70 of metal beams welded together. The lateral extent of the back portion 60 is fractionally less than the lateral extent of the compartment of the main storage unit 24.

The shelf unit positioning assembly 56 selectively moves the shelf unit 54 between a loading/unloading position to effect loading of the golf carts 16 and the like, a support position to support the golf carts 16 and the like during transport and storage of the carts, and a disengaged position for the loading, unloading and transport of conventional loads. As best seen in FIGS. 2 and 7, the shelf unit positioning assembly 56 includes a cable and winch system 72 having a reversible winch 74 (see FIG. 2) fixedly mounted to the rear center of the ceiling 46. The cables of the cable and winch system 72 include a pair of drive cables 76, a pair of trunk cables 78 and a pair of branch cables 80A and 80B. Each drive cable 76 has one end mounted to the back shelf portion 60 and its other end mounted to the rotating shaft of the winch 74. The drive cables 76 are mounted to the winch 74 such that they are simultaneously wound or unwound during rotation of the winch shaft. Each drive cable 76 extends from the winch 74 in a direction generally parallel to the ceiling 46 and laterally toward a respective one of the side wall members 34, around a guide pulley 82 mounted to the respective side wall member 34 and extends downwardly parallel to the respective side wall member 34 to terminate at a cotter pin assembly 81 which selectively connects it to the back shelf portion 60. The drive cables 76, the trunk cables 78 and the branch cables 80 are of conventional twisted steel cable or other suitable cable having sufficient tensile strength and durability to support the retractable shelf unit 54 during repeated raising and lowering of the retractable shelf unit 54 as well as during movement of the back shelf portion 60 relative to the front shelf portion 58.

As seen in FIGS. 2 and 7, each trunk cable 78 is normally secured to the back shelf portion 60 by a cotter pin assembly 83 to the underside of the back frame portion 60 opposite the cotter pin assembly 81. Each trunk cable 78 extends downwardly generally parallel to the respective side wall member 34 thereadjacent, is trained around a pair of guide pulleys 84 and 86 rotatably mounted to the chassis 18, then extends generally parallel to the side wall member 34 and is trained around a third guide pulley 88 and extends vertically generally parallel to the respective side wall member 34 and the ceiling 46 to a fourth guide pulley 89. Thereafter, each trunk cable 78 extends to a connecting assembly 91 which connects it to the front shelf portion 58. One end of each of a pair of the branch cables 80A and 80B are connected to a respective one of trunk cables 78 at spaced locations along the extent of the trunk cable between the third guide pulley 88 and the fourth guide pulley 89. The branch cables 80A are connected to the front shelf portion 58 and the branch cables 80B are connected to the back shelf portion 60. A branch pulley 85 is mounted to each side wall member 34 and associated with one of the branch cables 80A, and a branch pulley 87 is mounted to each side wall member 34 and associated with one of the branch cables 80B. The branch pulleys 85, 87 are positioned relative to the connections of the branch cables 80A and 80B to the trunk cable 78 such that movement of the trunk cable 78 produces movement of the branch cables 80A and 80B over their associated guide pulleys 85 and 87.

As shown in FIG. 7, the shelf unit positioning assembly 56 additionally includes a plurality of frame guide wheels 90 rotatably mounted to the frame 66 of the front shelf portion 58 and extending laterally therefrom which are rotatably movable along a vertically extending alignment strip 92 formed of an elongate metal strip welded to each side wall member 34 slightly above the L-shaped metal beam 42 associated therewith and extending slightly over the top of the metal beam.

As shown in FIG. 7, in its support position, the shelf unit front portion 58 is supported on the steel beams 42 and the shelf unit back portion 60 is aligned in co-planar relation with the shelf unit front portion 58 and is supported on the brackets 40. To raise the shelf unit 54 from its support position to its disengaged position in which it is substantially flush with the ceiling 46 (as shown in the broken lines in FIG. 2), the operator need only operate the winch 74, (which can be operated, for example, by means of a hand held remote unit RU-1 as shown in FIG. 7) to wind the drive cables 76 onto the winch. As can be understood, the winding of the drive cables 76 causes the shelf unit back portion 60 to be raised in a generally horizontal manner by the drive cables 76 and the branch cables 80B connected thereto, and causes the shelf unit front portion 58 to be raised in a generally horizontal manner by the branch cables 80A and the trunk cables 78 connected thereto.

Figure 10:
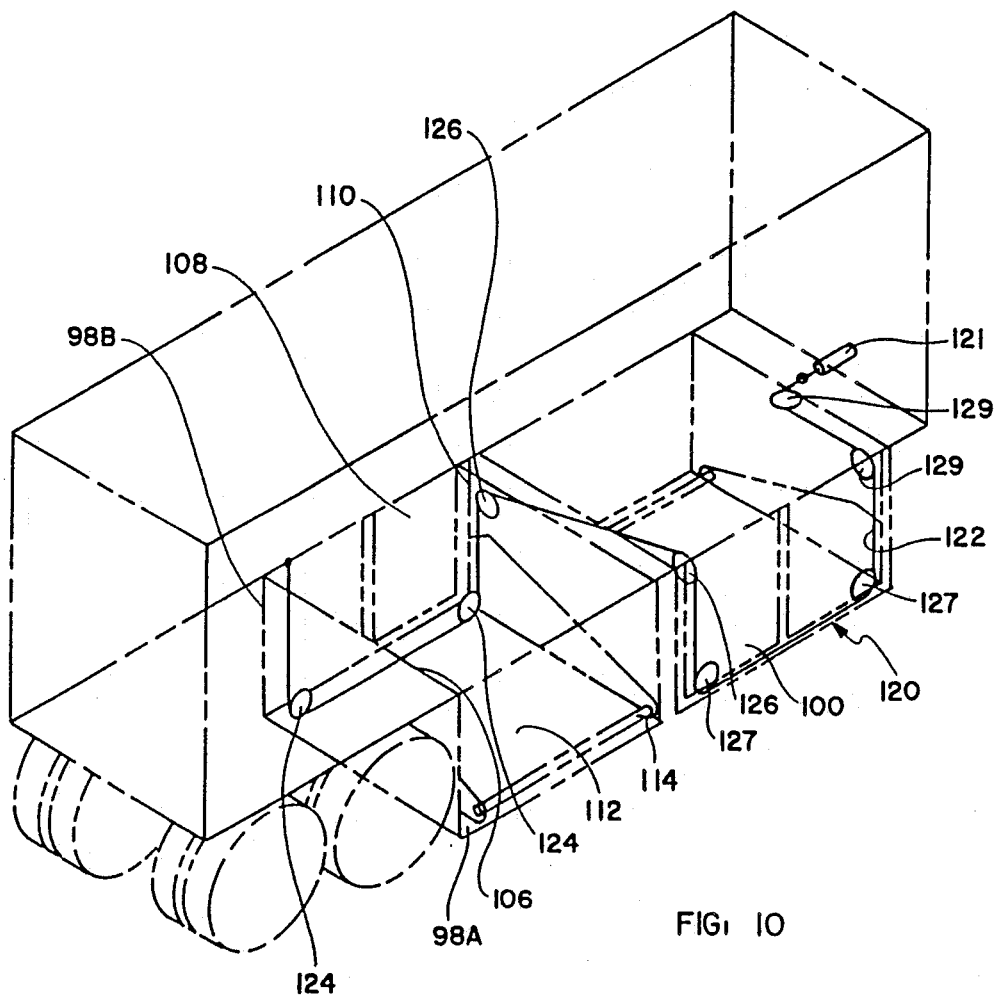
FIG. 10 is a diagrammatic view of the transport apparatus shown in FIG. 1, illustrating the cable operating system therefor.

As shown in FIGS. 1, 2, 3, 5 and 6, the underchassis storage unit 26 includes a pair of vertically extending apron wall members 98A and 98B, each forming a generally vertical extension of one of the side wall members 34 from the bottom edge thereof to a location slightly above the road surface. As shown in FIG. 1, the right-hand apron wall member 98A (as viewed in the direction of travel) is formed of a metal skin supported on a metal framework and includes a rectangular recess 100 having a pair of pivoting door halves 102 for selectively permitting access into the recess associated therewith. The door halves 102 are each hingedly connected by hinges 104 to the chassis 18 for pivoting about a generally vertical axis. When the door halves 102 are pivoted toward one another and brought into generally coplanar relation to prevent access to the rectangular recess 100, the right-hand apron wall member 98A presents a generally linear, continuous appearance. As shown in FIG. 10, the left-hand apron wall member 98B includes a rectangular recess 106 which is behind the recess 100. The rectangular recess 106 has a pair of door halves 108 associated therewith for selectively permitting access through the recess, and the door halves 108 are each pivotally connected to the apron wall member 98B by a pair of hinges 110. It will be noted that the two recesses 100 and 106 open at opposite sides of the trailer 10 and closure doors 102 and 108 are likewise located on opposite sides of the trailer 10.

As seen in FIGS. 1 and 10, the recesses 100 and 106 each have a side loading cart tray 112 associated therewith. Each tray 112 has an extent in the direction of travel sufficient to accommodate two of the golf carts 16 parked side by side at an orientation perpendicular to the direction of travel. Each side loading cart tray 112 is formed of a generally planar steel plate 113 and a pair of side walls 115 extending perpendicularly from respective opposite edges of the steel plate. Each tray 112 operates as a self-loading support for a pair of the golf carts 16 and is pivotally mounted to one of the apron wall members 98 by a pivot means 114 for pivoting about an axis generally parallel to the direction of travel of the trailer 10. The extent of each tray 112 in the direction perpendicular to the direction of travel is slightly less than the lateral extent of the main storage compartment 24.

As best seen in FIGS. 2 and 10, a tray cable system 120 is provided for selectively raising and lowering the trays 112 and includes a cable movement means 121, such as a hydraulic piston assembly or a winch, and a single length of cable 122 secured at one end thereof to the cable movement means 121. The other end of the cable 122 is anchored to the left-hand apron wall member 98B, and the cable 122 extends therefrom along a path in which it is trained around a pair of tray pulleys 124 rotatably mounted to the tray 112 associated with the recess 106, a first plurality of underchassis pulleys 126 rotatably mounted to the underside of the chassis 18, a pair of tray pulleys 127 pivotally mounted to the tray 112 associated with the recess 100, and a second plurality of underchassis pulleys 129 pivotally mounted to the underside of the chassis 18. The other end of the cable 122 is connected to a tray winch 121 fixedly mounted to the chassis 18 for winding thereon. Each tray 112 includes a generally square elongate channel 130 (See FIG. 3) formed of bent metal extending along the front edge of the tray 112, and extending between the associated pair of tray pulleys 124, 127 for enclosing the extent of the cable 122 between the two associated tray rollers, respectively. When the cable 122 is retracted by the cable movement means 121, the cable length shortens and acts to pivot the trays 112 upwardly about their associated pivot means 114. Alternatively, when the cable 122 is extended, the weight of each tray 112 causes it to pivot downwardly about its associated pivot means 114 until its elongate channel 130 contacts with the road surface.

Figure 3:
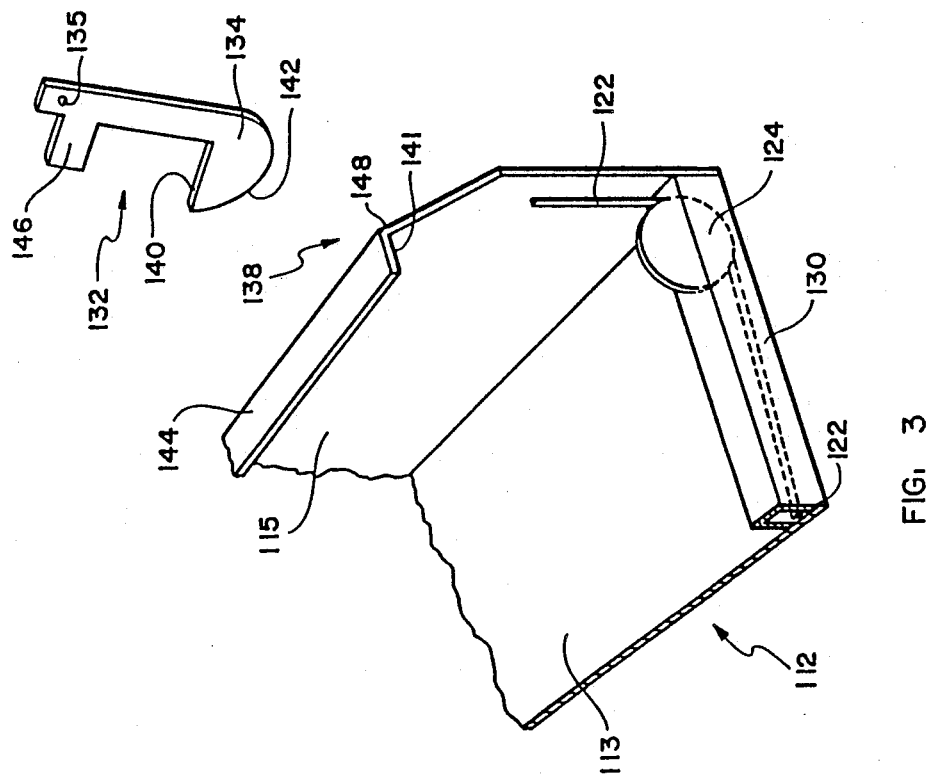
FIG. 3 is an enlarged partial perspective view of the underchassis storage unit of the transport apparatus of the present invention.
Figure 5:
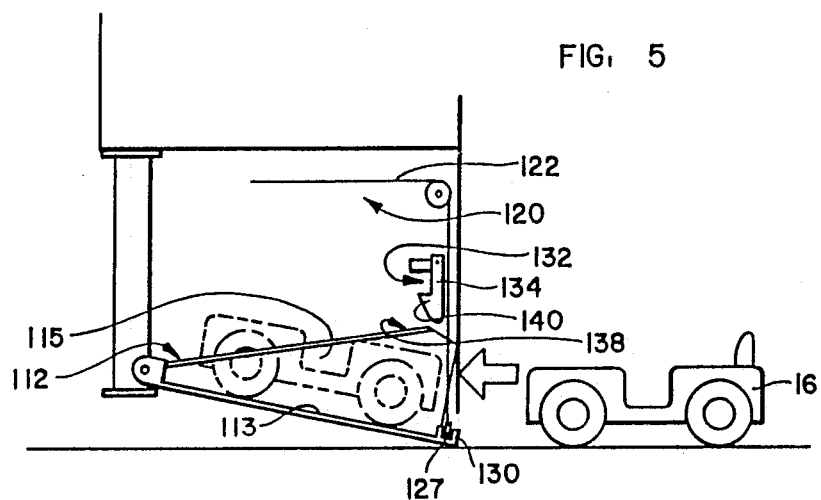
FIG. 5 is a partial rear elevational view in vertical section, taken along lines V—V of FIG. 1.
Figure 6:
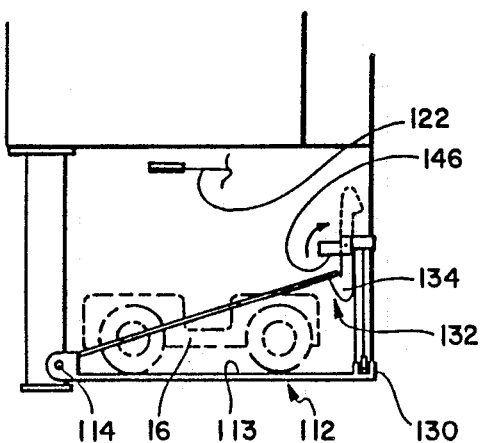
FIG. 6 is a partial rear elevational view in vertical section similar to FIG. 5, but in a different operation position.

To relieve the cable 122 from supporting either the weight of the trays 112 themselves of the weight of the trays with the golf carts 16 loaded thereon, each tray 112 has a self-actuating latch assembly 132 associated therewith, as best seen in FIGS. 3, 5 and 6. Each self-actuating latch assembly 132 includes a pair of retaining hooks 134 each pivotally mounted by a pivot connection 135 to one of the apron wall members 98. A retaining hook engaging means 138 is formed in each vertically upright side wall 115 of each tray 112. As best seen in FIG. 3, each retaining hook 134 includes a projection 140 formed on its free end, the projection 140 having a contoured engagement surface 142 for engagement by the retaining hook engagement means 138 on the associated upright end portion of the tray 112, and includes a counterweight 146. Each retaining hook engagement means 138 includes a bent upper edge portion 148 of the side wall 115 having a top planar surface 144 extending perpendicularly to the side wall and a shoulder 141 formed at one end of the bent upper edge portion 148.

The mass of the counterweight 146, and the spacing thereof from the pivot connection 135 of the retaining hook 134, causes the retaining hook projection 140 to lie generally vertically below the pivot connection 135 when the retaining hook is freely suspended therefrom. Accordingly, the contoured engagement surface 142 is automatically positioned for proper engagement by the retaining hook engagement means 138 as the tray 112 is raised by operation of the cable 122. Specifically, as the tray 112 rises, the contoured engagement surface 142 slides along the bent upper edge portion 148, thereby causing the retaining hook 134 to pivot until the retaining hook projection 140 clears the shoulder 141. Thereafter, the action of the counterweight 146 immediately pivots the retaining hook 134 to its freely suspended position, thus bringing the retaining hook 140 into the position for supporting the edge portion 148 thereon. Once the cable 122 has been operated to raise the tray 112 so that the hook projections 140 are in their supporting positions, the tray cable system 120 is reversed slightly to lower the tray 112 so that the edge portions 148 of the tray 112 rest on the underlying retaining hook projections 140, whereby the weight of the tray 112 is supported on its associated pair of retaining hooks 136 as shown in FIG. 6.

The loading and unloading operation of the trays 112 is as follows. To load a pair of the golf carts 16 onto each tray 112 for transport thereof, the tray cable system 120 is actuated to unwind the cable 122 from the cable movement means 121. As the effective length of the cable 122 increases, the channel 130 of each tray 112 moves downwardly as the tray pivots under its own weight about its pivot means 114 until the channel 130 eventually comes to rest on the road surface. At this position, as shown in FIG. 5, golf carts and the like can be easily driven or rolled up the inclined steel plate 113 for loading. When each tray 112 has been loaded with a pair of the wheeled vehicles or selected one of the trays has been so loaded, the cable movement means 121 is actuated to wind the cable 122, thereby causing each downwardly pivoted tray to pivot upwardly. During the upward pivoting of each tray, the pair of retaining hooks 134 associated therewith are engaged by the retaining hook engagement means 138 of the tray in the manner described above. Once the trays 112 have been brought into a position in which the golf carts supported thereon are generally horizontal, the cable movement means 121 is reversibly rotated so that the cable 122 unwinds under the urging of the trays 112 thereagainst until each tray 112 comes to rest on its associated retaining hook projections 140.

To unload the carts 116 from the trays 112, the operator merely actuates the cable movement means 121 to slightly wind the cable 122, thus relieving the retaining hooks 134 of the weight of their associated trays 112. Then, the operator manually pivots each retaining hook 134 to withdraw the hook projection 140 from its support position beneath the edge portion 148 and each retaining hook 134 is further pivoted to an over the center position in which it remains when the operator releases it (shown in broken lines in FIG. 6). The operator then actuates the cable movement means 121 to allow the cable 122 to unwind therefrom as the weight of each tray 112 bears against the cable. As can be understood, if the operator desires to retain one or more of the trays 112 in its generally horizontal transport position in which its weight is supported by its associated pivot means 114 and retaining hooks 134, the operator merely foregoes the manual pivoting of the hooks 134 associated with the selected trays 112. Consequently, during winding and unwinding of the cable 122, the trays 112, which are still supported on their retaining hooks 134 will remain in their generally horizontal transport position.

Each tray 112 is thus provided with a self-ramping capability for loading a pair of the carts 16 thereon. In practice, it has been found that sufficient clearance exists between the floor 113 of each tray 112 and the chassis 18 for an operator to drive a self-powered golf cart of standard dimensions onto the tray, park and brake the golf cart, remove the steering wheel therefrom (to provide sufficient clearance once the tray has been raised) and to exit, in a crouched position, from under the trailer 10. Thus, it can be appreciated that the trays 112 provide convenient, easily accessible means for loading, unloading and transporting a plurality of the golf carts 16, thus advantageously enlarging and enhancing the transport capabilities of the trailer 10. The capability to selectively individually move each tray 112 between its loading and unloading position and its transport position makes this feature especially attractive for conveniently delivering discrete numbers of carts to a plurality of individual locations without the need to open the main storage unit 24.

One embodiment of the ramp 28 is illustrated in FIGS. 1, 4 and 7 and includes a first ramp member 152 and a second ramp member 154, one edge of the first ramp member 152 being pivotally connected to the rear edge of the floor 32 by a hinge 156 and the opposite edge of the first ramp member 152 being pivotally connected by a hinge 158 to an edge of the second ramp member 154. A ramp winch 160 is fixedly mounted to the covering 44 adjacent its rear edge and is of conventional type having a winding cylinder rotatably mounted on a shaft. A first ramp cable 162 is connected at one end to and wound on the cylinder of the ramp winch 160 and the opposite end of the ramp cable is fixedly connected to the first ramp member 152 adjacent the hinge 158. A second ramp cable 163 is connected to one of the side wall members 34 and to the first ramp member 152. A wheel assembly 164 including a single small wheel is mounted at the mid point of the edge of the second ramp member 154 opposite the edge thereof to which the interconnecting means 158 is connected.

The ramp 28 is movable between a loading position and a storage position. In its loading position, the first ramp member 152 and the second ramp member 154 are generally coplanar and are downwardly inclined from the floor 32 with the small wheel of the wheel assembly 164 resting on the road surface. In the storage position, the first ramp member 152 is generally upright and the second ramp member 154 is also generally upright and in generally flush relation with the upper ramp member 152. To move the ramp 28 between its loading position and its storage position, the operator need only actuate the ramp winch 160 to wind the ramp cable 162. This winding of the cable 162 causes the first ramp member 152 to pivot on the pivot means 156 into its generally upright storage position while the second ramp member 154 freely pivots about the interconnecting means 158 until it is substantially flush with the upper ramp member 152. FIG. 4 illustrates a point in the winding process shortly before the ramp members 152, 154 reach their generally upright storage positions. With the ramp 28 in its storage position, the ramp winch 160 is deactivated and the doors 50 of the trailer 10 can be moved into their shut position.

Alternatively, to move the ramp 28 from its storage position to its ramping position, the doors 50 of the trailer 10 are swung open and the ramp winch 160 is activated to unwind the ramp cable 162 therefrom. As the first ramp member 152 pivots in a counterclockwise direction about the pivot means 156, the second ramp member 154 pivots outwardly from the trailer 10 and away from its flush relation with the first ramp member 152. As the unwinding of the ramp cable 162 continues, the small wheel of the wheel assembly 164 eventually rollingly engages the road surface and the second ramp member 154 continues to pivot clockwise with respect to the first ramp member 152 until the two ramp members are in generally coplanar alignment, at which time the ramp winch 160 is deactivated.

The intermediate support assembly 52 is cooperataively operable with the ramp 28 to load and unload the golf carts 16 and the like onto the shelf unit 54 by the operator disposing the ramp 28, in the above-described manner, in its loading position, and disposing the shelf unit 54 in its loading/unloading position in the following manner. As will become clear, the ramp 28 and the shelf unit 54 cooperate together to provide a surface having a generally constant slope for smooth loading and unloading the golf carts 16 and the like between the road and the intermediate support assembly 52.

Prior to its deployment to its loading/unloading position, the shelf unit 54 is disposed either in disengaged position (shown in broken lines in FIG. 2) in which the shelf unit is substantially flush with the ceiling 46 or in its support position (shown in solid lines in FIGS. 2 and 7) in which it is supported generally parallel to the ceiling 46 and intermediate the ceiling and the floor 32. If the shelf unit 54 is initially deployed in its disengaged position and the operator desires to deploy the shelf unit into its loading/unloading disposition, the operator need only pivot the load bearing brackets into flush relation with the side wall members 34 and then activate the winch 74 to unwind the drive cables 76 therefrom. The weight of the shelf unit 54 exerts a downward force on the drive cables 76, the branch cables 80A, 80B and the trunk cables 78 and, accordingly, the shelf unit is lowered in a substantially horizontal disposition until the shelf unit front portion 58 comes to rest on the L-shaped metal beams 42. Then, the operator manipulates the cotter pin assemblies 83 to disconnect the trunk cables 78 from the bottom of the back portion 60. Thereafter, continued unwinding of the drive cables 76 from the winch 74 permits the end of the shelf unit back portion 60 which is adjacent the rear of the trailer 10 to drop toward the floor 32 while the shelf unit back portion 60 pivots about the coupling hinge 62. When the rear edge of the back portion 60 comes to rest on the floor 32, the back portion 60 presents an upwardly inclined surface extending from adjacent the top of the ramp 28 to the rear edge of the shelf unit front portion 58. Thus, the golf carts 16 and the like can be individually driven up the ramp 28 and the back portion 60 onto the front portion 58 for parking thereon.

Once the front portion 58 is loaded with its complement of the golf carts 16 and the like, additional carts and the like can be driven onto, and parked on, the inclined back portion 60. Thereafter, the operator activates the winch 74 to wind the drive cables 76 thereon to raise the back portion 60 to its horizontal, generally co-planar disposition with the front portion 58 (i.e., the support position of the shelf unit 54). The floor 32 can then be loaded with a complement of the additional golf carts 16 and the like, using the deployed ramp. To relieve the drive cables 76 and the branch cables 80A of the weight of the back portion 60 with its complement of golf carts and the like parked thereon, and to enhance the safety of the trailer 10, the operator can pivot the brackets 40 to perpendicular orientations with respect to the side wall members 34 to support the back portion 60 thereon.

If the shelf unit 54 is disposed in its support position and the operator desires to dispose it in its loading/unloading disposition, the operator activates the winch 74 to unwind the drive cables 76, whereby the back portion 62 pivots about the coupling hinge 62 until its rear edge comes to rest on the floor 32, and the procedure for loading the golf carts and the like, as described above, is repeated. Thus, it will be understood that the movable shelf unit 54, in its support position, permits a larger number of golf carts and the like to be supported in two tiers within the over-the-road vehicle for transportation to their destination. Moreover, after the golf carts have reached their destination and have been unloaded, the shelf unit 54 can be quickly raised to its disengaged position adjacent the ceiling, whereupon the over-the-road vehicle is ready to transport conventional loads on its return trip, or to any other desired destination.

Figure 8:
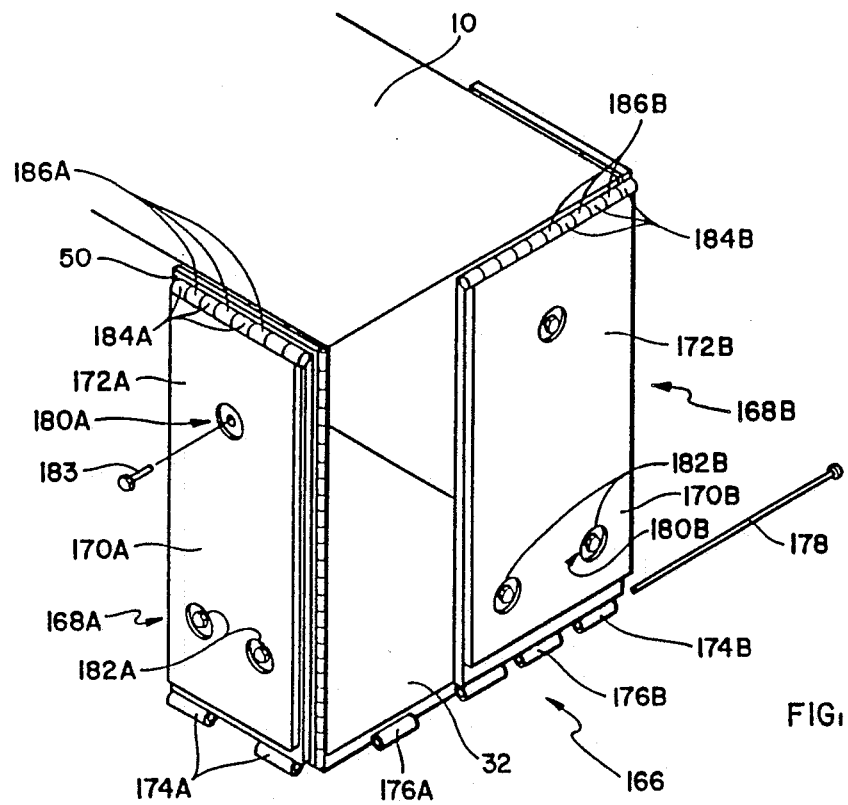
FIG. 8 is a rear perspective view of another embodiment of the ramp member of the transport apparatus of the present invention.
Figure 9:
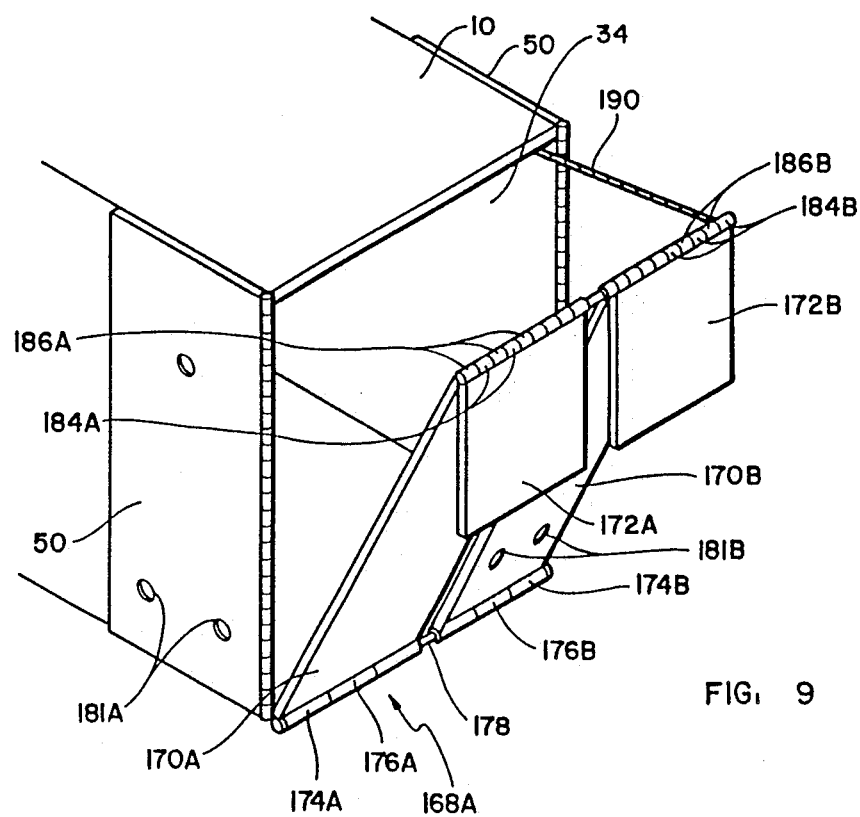
FIG. 9 is a rear perspective view of the ramp member shown in FIG. 8, but in a different operation position.

In FIGS. 8 and 9, a second preferred embodiment of the ramp of the transport apparatus of the present invention is illustrated and is generally designated as 166. The ramp 166 includes a pair of identically configured ramp halves 168A and 168B. Each ramp half 168A, 168B includes a dual purpose door and ramp portion 170A, 170B, respectively, and an extension member 172A, 172B, respectively. Each door and ramp portion 170A and 170B is provided with a pair of ramp ramp hinge pin inserts 174A, 174B, respectively, which mate with a pair of floor hinge pin inserts 176A, 176B, respectively, to form an insert bore for receiving a common hinge pin 178. The ramp 166 also includes a pair of door attachment assemblies 180A, 180B, respectively, and each door attachment assembly includes a plurality of threaded bores 181A, 181B in the door halves of the door 50, a plurality of correspondingly located throughbores 182A, 182B in the door and ramp portions 170A, 170B and a plurality of door bolts 183. The door bolts 183 are insertable through the throughbores 182A, 182B and threadably received in the threaded bores 181A, 181B to secure each ramp half 168A, 168B to a respective half of the door 50 for movement therewith. The extension members 172A, 172B are each provided with a plurality of hinge pin inserts 184A, 184B, respectively, which are selectively mateable with a plurality of hinge pin inserts 186A, 186B, respectively, formed on door and ramp portions 170A, 170B, respectively. The hinge pin inserts 184A, 184B, 186A and 186B mate with one another in alternating side-by-side relation to form a bore in which a hinge pin is permanently received. Each door and ramp portion 170A, 170B is connected to one of a pair of ramp cables 190 (one of which is shown in FIG. 9) of a ramp cable winch system which is not illustrated but which is similar in structure and operation to the ramp winch system of the embodiment of the ramp 28 described above.

In operation, the operator selectively deploys the ramp halves 168A, 168B, via the hand-held remote unit RU-2, as the two halves of a ramp extending from the floor 32 of the trailer 10 to the road surface or as the two halves of a door which permit selective access and closure of the interior of the trailer 10. As best shown in FIG. 9, in the ramp disposition, the door attachment assemblies 180A, 180B are in their unconnected dispositions so that each ramp half 168A, 168B can move independently with respect to its associated door half and the ramp hinge pin inserts 174A, 174B are mated with their respective floor hinge pin inserts 176A, 176B to form an insert bore for receiving the hinge pin 178. With the hinge pin 178 thus inserted to hingedly connect the ramp and door halves 168A, 168B to the floor 32 and with the bolts 183 removed from the threaded bores 181A,181B, the ramp 166 can be deployed to load and unload the golf carts 16 and/or conventional loads by pivoting the ramp halves 168A,168B about the hinge pin 178. If desired or required, the ramp halves 168A,168B can be secured together in their deployed position by any convenient mechanical securing arrangement. By operation of the ramp winch system to selectively extend and retract the ramp cables 190, the door and ramp members 170A, 170B are selectively moved between vertically upright positions in which they substantially cover the opening at the back of the trailer 10 to prevent access thereto, and a ramp position in which the extension portions 172A, 172B are disposed substantially coplanar with their respective door and ramp portions 170A, 170B so as to extend outwardly from the floor 32 at a downward incline to the road surface. FIG. 9 illustrates an intermediate position of the ramp 166 as it is deployed from its trailer closing position to its ramp position.

The ramp 166 is also configurable to a door disposition to provide access to the interior of the trailer 10 in the same manner as provided by the doors 50. This configuration is especially useful for backing the trailer 10 into a position adjacent a load originating location such as a loading dock or the like so that the golf cart 16 or conventional loads can be loaded and unloaded directly from the loading dock into the trailer 10 without the need for a ramp. To configure the ramp 166 for this door configuration, the ramp winch system is operated to pivot the door and ramp portions 170A, 170B into their upright positions in which they prevent access to the interior of the trailer 10. Thereafter, the bolts 183 are inserted through the throughbores 182A,182B and threaded into the threaded bores 181A,181B to secure the door and ramp portions 170A,170B to the door halves of the door 50 for movement therewith. The hinge pin 178 is then removed so that each ramp half 168A, 168B is movable with its associated door half between a position for preventing access to the interior of the trailer 10 in which each ramp half is in a covering position across one-half of the rear of the trailer 10 (as illustrated by the disposition of the ramp half 168B in FIG. 8) and an open position (as illustrated by the ramp half 168A in FIG. 8) in which each ramp half is pivoted to a position in which it is substantially flush with the door 50 in its open position.

As can be understood, the ramp 166 is easily configurable between a ramp disposition in which the golf carts 16 and the conventional loads can be wheeled into the trailer 10 and unloaded from it, and a door disposition in which the trailer 10 can be placed closely adjacent a loading dock or the like for loading and unloading the golf carts 16 and the conventional loads.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a vehicle for transporting golf carts and the like, the vehicle having a chassis, an apparatus for supporting golf carts and the like on the chassis during transport thereof, and comprising:

a substantially enclosed compartment mounted on the vehicle chassis, said substantially enclosed compartment including a pair of spaced apart, generally parallel wall means, each wall means having an upper and lower portion, said wall means upper portions supporting therebetween an overhead covering means, and floor means positioned between said pair of wall means and connected to said wall means lower portions, said wall means, said overhead covering means and said floor means defining the boundaries of the interior of said substantially enclosed compartment;

intermediate support means disposed interiorly of said substantially enclosed compartment, and including a first portion extending generally horizontally and being movable between a first support position intermediate said compartment overhead conveying means and said compartment floor means for supporting golf carts and the like thereon and a second storage position adjacent said overhead conveying means, and a second portion pivotally connected directly to said first portion, said second portion being movable between a first loading position extending upwardly from said floor means to said first portion, a second support position at which it is disposed in planar relation to said first portion at said first position therefor for supporting golf carts and the like therein, and a third storage postion adjacent said overhead conveying means, said first and second portions together extending substantially across the full extent of said enclosed compartment when they are in said support positions thereof;

selectively operable load bearing means arranged for movement between a first dispostion for supporting said second support means portion and said golf carts and the like carried therein when said second support means portion is at said second support position thereof, and a second disposition at which said load bearing means is clear of any said movement of said second support means portion between said first, second and third positions thereof; and means for selectively moving said first support means portion between said first position and said second position thereof, and for moving said second support means portion between said first, second and third positions thereof.

2. In a vehicle for transporting golf carts and the like, an apparatus according to claim 1 and characterized further by an auxiliary load supporting means for supporting at least one additional golf cart and the like in the clearance between the vehicle chassis and the road.

3. In a vehicle for transporting golf carts and the like, an apparatus according to claim 2 and characterized further in that said auxiliary load supporting means includes a frame for supporting the additional golf cart or the like in a substantially stationary position relative to the vehicle during normal traveling operation of the vehicle along the road, said frame including a plate member for supporting the wheels of the golf cart and the like during rolling movement therealong, said plate member having a front and back edge, and means for mounting said frame to the vehicle for selective movement between a receiving position in which said plate member front edge is positioned closely adjacent the road and said plate member is inclined toward the road from its back edge to its front edge, whereby the additional golf cart or the like can easily be rolled from the road and onto said inclined plate member, and vice versa, and a transport position in which said plate member is disposed at a height sufficiently above the road for normal traveling operation of the vehicle along the road while supporting the additional golf cart or the like thereon.

4. In a vehicle for transporting golf carts and the like, an apparatus according to claim 1 and characterized further in that said selectively operable load bearing means includes a movable bracket mounted in said wall means for selectively supporting said second portion of said intermediate support means at said second support position thereof.

5. In a vehicle for transporting golf carts and the like, an apparatus according to claim 1 and characterized further in that said selective moving means is operable to move said intermediate support means into substantially flush relation with said overhead covering means in said storage positions of said first and second support means portions.

6. In a vehicle for transporting golf carts and the like, an apparatus according to claim 1 and characterized further in that each said wall means includes a plurality of movable brackets, said movable brackets being movable between a flush position in which they are substantially flush with the associated said wall means and a support position in which they extend generally perpendicularly to the associated said wall means for supporting said intermediate support means thereon.

7. In a vehicle for transporting golf carts and the like, an apparatus according to claim 1 and characterized further by a ramp means mounted on the vehicle, said ramp means being movable between a storage position in which it is disposed for transport by the vehicle and a loading position in which it extends between said floor means and the road to provide an inclined surface for the travel therealong of the golf carts and the like from the road into said interior of said substantially enclosed compartment, and vice versa.

8. In an over-the-road vehicle for transporting golf carts and the like, the over-the-road vehicle having a primary load supporting structure for supporting the golf carts and the like during transport and the primary load supporting structure being mounted on a chassis and wheel assembly at a clearance above the road along which the over-the-road vehicle travels, an auxiliary load supporting structure for supporting at least an additional golf cart or the like in the clearance between the primary load supporting structure and the road, comprising:

frame means for supporting the additional golf cart or the like in a substantially stationary position relative to the over-the-road vehicle during normal traveling operation of the over-the-road vehicle along the road, said frame means including a plate member for supporting the wheels of the golf cart and the like during rolling movement therealong, said plate member having a front and back edge; and means for mounting said frame to the over-the-road vehicle for selective movement between a receiving position in which said plate member front edge is positioned closely adjacent the road and said plate member is inclined toward the road from its back edge to its front edge, whereby the additional golf cart or the like can easily be rolled from the road and onto said inclined plate member, and vice versa, and a transport position in which said plate member is disposed at a height sufficiently above the road for normal traveling operation of the over-the-road vehicle along the road, while supporting a golf cart or the like thereon.

9. In an over-the-road vehicle for transporting golf carts and the like, an auxiliary load supporting structure according to claim 8 and characterized further in that said mounting means includes hinge means for hingedly mounting said frame to the over-the-road vehicle for pivoting about an axis generally parallel to the direction of travel of the over-the-road vehicle.

10. In an over-the-road vehicle for transporting golf carts and the like, an auxiliary load supporting structure according to claim 9 and characterized further by means for selectively moving said frame between said receiving position and said transport position.

11. In an over-the-road vehicle for transporting golf carts and the like, an auxiliary load supporting structure according to claim 10 and characterized further in that said selective moving means includes cable means connected at one end to the over-the-road vehicle, and a cable movement means connected to the other end of said cable and mounted to the over-the-road vehicle, said cable being movable by said cable movement means to selectively pivot said frame between said receiving position and said transport position thereof.

12. In an over-the-road vehicle for transporting golf carts and the like, an auxiliary load supporting structure according to claim 11 and characterized further by a self-actuating latch assembly for selectively preventing downward pivoting of said frame, said latch assembly including a retaining hook pivotally mounted to the over-the-road vehicle and having means for normally maintaining said hook in a predetermined position adjacent said frame, said hook being formed with contoured surface means arranged to be engaged by said frame during upward movement thereof to pivot said hook away from said predetermined position, said hook including return means for causing said hook to be pivoted back to said predetermined position for engaging said frame and releasably maintaining it at said transport position thereof.

13. In an over-the-road vehicle for transporting golf carts and the like, an auxiliary load supporting structure according to claim 12 and characterized further in that said return means includes a counterweight disposed thereon to move said hook back to said predetermined position.

14. In an over-the-road vehicle for transporting golf carts and the like, an auxiliary load supporting structure according to claim 12 and characterized further in that said frame includes a pair of side wall means, each side wall means extending from a respective opposed edge of said plate means and one of said wall means is arranged to engage said contoured surface means of said hook during said upward movement of said frame.

15. An apparatus for storing golf carts and the like in generally fixed positions relative to one another during transport of the stored vehicles by a much larger over-the-road wheeled vehicle comprising:

a generally box-like main storage compartment having a floor of generally parallelogram configuration, a pair of spaced apart, generally parallel, generally rigid wall members, said wall members being connected to said floor adjacent respective opposite edge portions thereof and extending substantially perpendicularly therefrom, and covering means supported on said wall members in generally facing relation to said floor, the area of said covering means bounded by said wall members defining the ceiling of said main storage compartment, and an access opening formed at one end of said main storage compartment;

a shelf disposed interiorly of said main storage compartment and movable therein, the boundary of said shelf substantially conforming to the boundary of said ceiling, said shelf having a substantially rigid surface for supporting a plurality of said golf carts or the like, said shelf having a front portion and a back portion interconnected to one another by a coupling means having a movement axis, said movement axis being generally perpendicular to said walls and said coupling means permitting movement of said front and back portions relative to one another about said movement axis;

control means for selectively moving said shelf toward and away from said ceiling, and for selectively moving said front shelf portion relative to said back shelf portion about said movement axis thereof, said control means being operable to move said shelf between:

a loading position for loading the golf carts and the like thereon at which said front shelf portion is disposed intermediate said ceiling and said floor and generally parallel thereto and said back shelf portion is disposed generally downwardly inclined from said front shelf portion toward said floor, a transport position for supporting the golf carts and the like during transport thereof at which said front and back shelf portion are individually supported and disposed intermediate said ceiling and said floor and generally parallel thereto, and a disengaged position at which said front and back shelf portions are disposed in substantially flush relation with a selected one of said ceiling or said floor.

16. In an over-the-road vehicle for transporting loads, the over-the-road vehicle having a load supporting structure including a floor and a chassis and wheel assembly for supporting the floor, an apparatus comprising:

a first ramp means;

means for selectively movably interconnecting said first ramp means to the over-the-road vehicle for movement of said first ramp means about a first axis between an intermediate position in which it is supported above the road and a loading position in which it provides support for movements of loads thereover; and means for selectively mounting said first ramp means to the over-the-road vehicle for movement of said first ramp means about a second axis generally perpendicular to the floor, said first ramp means being movable between said intermediate position and an access position for permitting movement of loads therepast.

17. In an over-the-road vehicle an apparatus according to claim 16 and characterized further by second ramp means, means for selectively interconnecting said second ramp means to the over-the-road vehicle for movement of said second ramp means independently of said first ramp means between an intermediate position in which said second ramp means is supported above the road and a loading position in which said second ramp provides support for movement of the loads thereover, and means for selectively mounting said second ramp means to the over-the-road vehicle for movement independent of said first ramp means about an axis generally perpendicular to the floor, said second ramp means being movable between said intermediate position and an access position for permitting movement of loads therepast.

18. In an over-the-road vehicle, an apparatus according to claim 17 and characterized further in that said first ramp means and said second ramp means each include an extension means movably connected thereto, each said extension means being movable between an extended position in which the effective length of each said ramp means is extended and a retracted position in which said extension member is in substantially flush relation with said ramp means.

* * * * *